(12) United States Patent
Chorpening et al.

(10) Patent No.: US 7,559,234 B1
(45) Date of Patent: Jul. 14, 2009

(54) REAL-TIME COMBUSTION CONTROL AND DIAGNOSTICS SENSOR-PRESSURE OSCILLATION MONITOR

(75) Inventors: Benjamin T. Chorpening, Morgantown, WV (US); Jimmy Thornton, Morgantown, WV (US); E. David Huckaby, Morgantown, WV (US); George A. Richards, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 853 days.

(21) Appl. No.: 10/997,090

(22) Filed: Nov. 24, 2004

(51) Int. Cl.
    *G01M 15/05* (2006.01)
(52) U.S. Cl. .................. 73/112.01; 431/12; 700/274; 422/83
(58) Field of Classification Search .......... 422/105, 422/107, 108, 110, 111, 83, 94–96, 98; 436/55; 431/12, 66, 75; 73/35.06, 35.08; 700/274
    See application file for complete search history.

(56) References Cited

U.S. PATENT DOCUMENTS

| | | | |
|---|---|---|---|
| 5,349,811 A | * | 9/1994 | Stickler et al. ............. 60/776 |
| 5,971,745 A | * | 10/1999 | Bassett et al. ............. 431/12 |
| 6,429,020 B1 | | 8/2002 | Thornton |
| 6,752,018 B2 | * | 6/2004 | Goldmeer et al. ............. 73/589 |
| 6,887,069 B1 | | 5/2005 | Thornton |
| 6,993,960 B2 | * | 2/2006 | Benson .................... 73/112.01 |

OTHER PUBLICATIONS

Lieuwen, T. "Statistical characteristics of pressure oscillations in a premixed combustor." J. Sound and Vibration. Feb. 6, 2003. 260(1): 3-17.*

* cited by examiner

*Primary Examiner*—Jill Warden
*Assistant Examiner*—Cedric Chan
(74) *Attorney, Agent, or Firm*—James B. Potts; Brian J. Lally; Paul A. Gottlieb (57) ABSTRACT

An apparatus and method for monitoring and controlling the combustion process in a combustion system to determine the amplitude and/or frequencies of dynamic pressure oscillations during combustion. An electrode in communication with the combustion system senses hydrocarbon ions and/or electrons produced by the combustion process and calibration apparatus calibrates the relationship between the standard deviation of the current in the electrode and the amplitudes of the dynamic pressure oscillations by applying a substantially constant voltage between the electrode and ground resulting in a current in the electrode and by varying one or more of (1) the flow rate of the fuel, (2) the flow rate of the oxidant, (3) the equivalence ratio, (4) the acoustic tuning of the combustion system, and (5) the fuel distribution in the combustion chamber such that the amplitudes of the dynamic pressure oscillations in the combustion chamber are calculated as a function of the standard deviation of the electrode current. Thereafter, the supply of fuel and/or oxidant is varied to modify the dynamic pressure oscillations.

9 Claims, 11 Drawing Sheets

Figure 3. Sample data from operation at a reference velocity = 25 m/s with $\Phi = 0.71$. The fuel system has been tuned for smaller pressure oscillations. The electrode signals in the left column are in $\mu A$; the OH emission signals are in arbitrary units (193 Hz case).

Figure 4. Sample data from combustor with reference velocity = 25 m/s, and $\Phi$ = 0.69. The fuel system has been tuned to produce large pressure oscillations. The electrode signals in the left column are in $\mu$A; the OH emission signals are in arbitrary units (164 Hz case).

Figure 5. Frequency spectra from real time data in the 193 Hz case. The peak magnitudes vary with electrode location, but the dominant frequency is constant.

Figure 6. Sensor statistics at Φ=0.6, Vref=25m/s.

Figure 7. Sensor statistics from Φ =0.7, Vref=25m/s.

Figure 8. Sensor statistics for Φ=0.8, Vref=25m/s. Primary oscillation frequencies of the points are indicated.

Figure 9. Correspondence between primary pressure frequency and primary frequency in guard current oscillations.

Figure 10. Diagram of apparatus.

Figure 11

REAL-TIME COMBUSTION CONTROL AND DIAGNOSTICS SENSOR-PRESSURE OSCILLATION MONITOR

The United States Government has rights in this invention pursuant to Agreement between National Energy Technology Laboratory and the inventors and the employer-employee relationship of the U.S. Department of Energy and the inventors.

FIELD OF THE INVENTION

The present invention relates to combustion dynamics in lean-premixed gas turbine combustors operating near the fuel-lean flame extinction limit to achieve very low $NO_x$ emission levels.

BACKGROUND OF THE INVENTION

The United States Department of Energy (DOE) National Energy Technology Laboratory (NETL) conducts programs that support the global interest for clean power generation such as the Turbine, Program. In support of the goals of the Turbine Program, researchers at NETL are developing sensor technology for combustion monitoring and control. This sensor development is based on using the flame's electrical properties to perform real-time diagnostics and in-situ monitoring of critical combustion parameters as set forth in Thornton, J., Richards, G.A., and Robey, E., "*Detetcing Flashback in Premix Combustion Systems*" presented at the American Flame Research Comittee International Symposium, Newport Beach, Calif., 2000, the disclosure of which is incorporated by reference.

It is well known that a flame can conduct electrical current as set forth in Thornton, J. D., Straub, D. L., Richards, G. A., Nutter, R. S., Robey, E., "*An In-Situ Monitoring Technique for Control and Diagnostics of Natural Gas Combustion Systems*," the 2nd Joint Meeting of the U.S. Sections of the Combustion Institute, Oakland, Calif., Mar. 25-28, 2001, the disclosure of which is incorporated by reference, and that the measured current conducted through the flame relates to the flame characteristics. The flame ionization detector (FID) used in gas chromatography uses the measured current through the flame to measure very low concentrations of hydrocarbons. The reaction most often cited for providing the FID response results from the chemi-ionization of CHO:

$$CH+O \rightarrow CHO^* \rightarrow CHO^+ + e^- \qquad (1)$$

Application of sufficient voltage allows complete collection of the generated electrons. The number of electrons produced has been found to be proportional to the number of hydrocarbons in the sample, with modifications for specific functional groups such as —OH.

To achieve very low $NO_x$ emission levels, lean-premixed gas turbine combustors have been commercially implemented which operate near the fuel-lean flame extinction limit. Near the lean limit, however, flashback, lean blowoff, and combustion dynamics have appeared as problems during operation. To help address these operational problems, a combustion control and diagnostics sensor (CCADS) for gas turbine combustors is being developed. CCADS uses the electrical properties of the flame to detect key events and monitor critical operating parameters within the combustor. Previous development efforts have shown the capability of CCADS to monitor flashback and equivalence ratio, see U.S. Pat. No. 6,429,020 issued to Thornton et al. Aug. 6, 2002, incorporated herein by reference, and a paper by Thornton, J. D., Straub, D. L., Richards, G. A., Nutter, R. S., Robey, E., "*An In-Situ Monitoring Technique for Control and Diagnostics of Natural Gas Combustion Systems*," the 2nd Joint Meeting of the U.S. Sections of the Combustion Institute, Oakland, Calif., Mar. 25-28, 2001, incorporated by reference herein, and in a patent application filed Sep. 18, 2001 by Thornton et al., U.S. Ser. No. 09/955,582, entitled *Real-Time Combustion Control and Diagnostics Sensor* (CCADS), the entire disclosure of which is incorporated by reference. Recent work has focused on detecting and measuring combustion instabilities. A highly instrumented atmospheric combustor has been used to measure the pressure oscillations in the combustor, the OH emission, and the flame ion field at the premix injector outlet and along the walls of the combustor.

However, pressure oscillations in the combustor result in variations in both the amplitudes and frequencies in the combustion chamber, possibly resulting in adverse consequences. Detecting and controlling the pressure oscillation in real time is a problem not yet solved.

SUMMARY OF THE INVENTION

It is an objective of the present invention to provide an apparatus and method for real time monitoring and control of dynamic pressures and oscillations in the combustion chamber of a lean-premixed gas turbine.

Another objective of the invention is to provide an apparatus for monitoring and controlling the combustion process in a combustion system having a combustion chamber to determine the amplitude of dynamic pressure oscillations in the combustion chamber during combustion, the apparatus comprising: a combustion system comprising a fuel nozzle in fluid communication with a combustion chamber; a fuel supply in communication with said fuel nozzle; an oxidant supply in communication with the fuel nozzle; ignition apparatus igniting the fuel and oxidant thereby initiating the combustion process producing hydrocarbon ions and electrons and an oscillating flame with dynamic pressure oscillations having both amplitudes and frequencies within the combustion chamber; an electrode in communication with the combustion system and hydrocarbon ions and/or electrons produced by the combustion process; calibration apparatus calibrating the relationship between a behavioral statistic of the current in the electrode and the amplitudes of the dynamic pressure oscillations in the combustion chamber by applying a substantially constant voltage between the electrode and ground and/or another electrode resulting in a current in the electrode and by varying one or more of (1) the flow rate of the fuel, (2) the flow rate of the oxidant, (3) the equivalence ratio, (4) the acoustic tuning of the combustion system, and (5) the fuel distribution in the combustion chamber, such that the amplitudes of the dynamic pressure oscillations in the combustion chamber are calculated as a function of the behavioral statistic of the electrode current; a control circuit connected to the electrode determining the behavioral statistic of the current in the electrode; a comparator connected to the control circuit and responsive thereto for comparing the behavioral statistic of the current in the electrode during operation of the combustion system to the calibrated relationship to determine the amplitudes of the dynamic pressure oscillations in the combustion chamber; and a controller in communication with the fuel supply and the oxidant supply and the control circuit and optionally in contact with the calibration apparatus for varying the fuel flow rate or the oxidant flow rate or the ratio of fuel to oxidant or the distribution of fuel in the combustion chamber or a combination thereof to reduce the amplitudes of the dynamic pressure oscillations in said combustion chamber, whereby the comparator and the control circuit cooperate to determine the amplitudes of the dynamic pressure oscillations in the combustion chamber and if at least some of the amplitudes attain a predetermined value calculated from the behavioral statistic of the current in the electrode and if required the controller varies one or more of (1) the flow rate of the fuel, (2) the flow rate of the oxidant, (3) the equivalence ratio, (4) the acoustic tuning of the combustion system, and (5) the fuel distribution in the combustion chamber to reduce and thereby control the amplitudes of the dynamic pressure oscillation in the combustion chamber. Behavioral statistic herein refers to any of the number of statistical parameters obtained through statistical analysis of the data, and specifically herein to refer to standard deviation, root mean squared (RMS), mean value, average deviation, skew and kurtosis. The examples included herewith cover the application of standard deviation; however, other statistical parameters may be used.

Yet another objective of the present invention is to provide a method of monitoring and controlling the combustion process in a combustion system to determine the amplitude and optionally the frequency of dynamic pressure oscillations during combustion, comprising: providing a combustion system including a fuel nozzle in fluid communication with a combustion chamber, a fuel supply and an oxidant supply along with means for igniting the fuel and oxidant thereby initiating the combustion process producing hydrocarbon ions and electrons and an oscillating flame with dynamic pressure oscillations having both amplitudes and frequencies within the combustion chamber; providing an electrode in communication with the combustion system and hydrocarbon ions and/or electrons produced by the combustion process; calibrating the relationship between the behavioral statistic of the current in the electrode and the amplitudes of the dynamic pressure oscillations in the combustion chamber by using the steps of applying a substantially constant voltage between the electrode and ground and/or another electrode resulting in a current in the electrode and by varying one or more of (1) the flow rate of the fuel, (2) the flow rate of the oxidant, (3) the equivalence ratio, (4) the acoustic tuning of the combustion system, and (5) the fuel distribution in the combustion chamber such that the amplitudes of the dynamic pressure oscillations in the combustion chamber are calculated as a function of the electrode current behavioral statistic to establish the relationship there between; determining the behavioral statistic of the current in the electrode during combustion; comparing the behavioral statistic of the current in the electrode during combustion to the calibrated relationship to determine the amplitudes and optionally the frequencies of the dynamic pressure oscillations in the combustion chamber; and controlling one or more of the fuel flow rate, the oxidant flow rate, the equivalence ratio, and the fuel distribution in the combustion chamber to reduce the amplitudes and optionally change the frequencies of the dynamic oscillations in the combustion chamber during combustion. Herein, hydrocarbon ions means any ion produced from the combustion of hydrocarbons, including but not limited to $CHO^+$, $H_3O^+$ and $^-OH$.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

In most practical combustion systems, mass flow rates are orders of magnitude higher than the flow rates in a FID. This makes complete charge collection very difficult (i.e., requiring very high electric field strength). However, a representative signal at various conditions may be obtained at relatively low electric field strengths.

Figure 1:
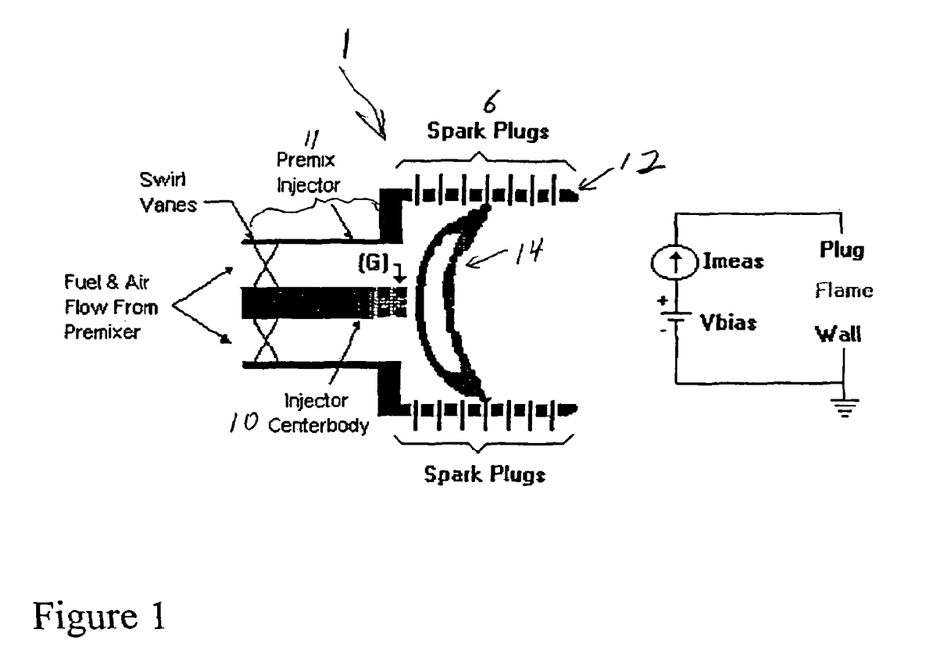
FIG. 1 is a functional diagram of a combustor used to demonstrate the present invention.

To study the charged species distribution in premixed, turbulent combustion, a special combustor, shown generally at 1, has been built with an electrode on the end of the premix injector centerbody 10, located along the center axis of the premix injector 11, and with electrodes along the combustion chamber walls 12. As illustrated in FIG. 1, the flame 14 provides a slightly conductive path between the electrode, identified with a G, the spark plugs 16 and the walls 12 of the combustor. As indicated in FIG. 1, a voltage is applied to the electrode G and the spark plugs 16 and the corresponding current is measured. The measuring system applies a bias to the electrodes and uses the electrons and ions in the combustion field to complete the circuit to ground (the steel walls of the combustor 12).

Figure 2:
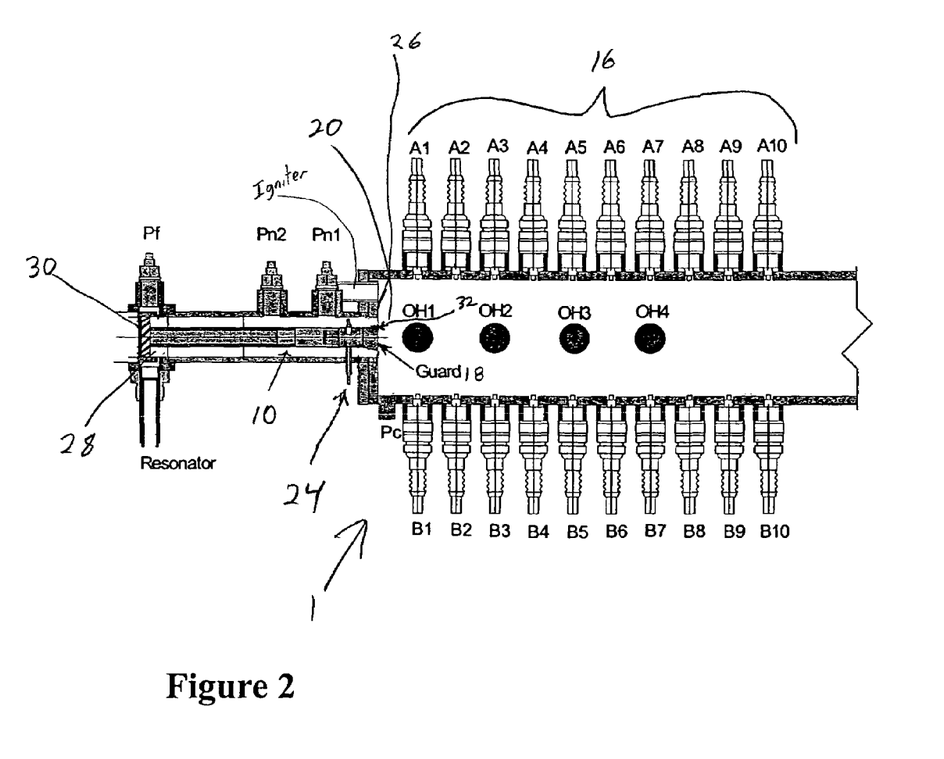
FIG. 2 is a diagram of the inlet end of an experimental combustor used in the following tests.

The resulting current is measured from each electrode. Although this device does not specifically select ions or electrons as charge carriers, it is probable that electrons are the primary charge carriers due to their considerably higher mobility. As used herein, the following represent:

Φ—Equivalence ratio
G—guard electrode or current to guard electrode
STD—standard deviation
RMS—root mean squared
Vref—reference velocity at combustor inlet Referring to FIG. 2, the test combustor, designated "Sparky," has an inside diameter of 78 mm (3.07") and an overall length of 927 mm (36.5"). The guard electrode 18 covers the last 2.5 cm (1") of the premix injector centerbody 10 at the combustor inlet 20. It is electrically isolated from the remainder of the injector by ceramic insulators around its support legs 24. The spark plug electrodes 16 are spaced on 25.4 mm (1") centers along the sides of the combustor 1, starting at the inlet end wall 26. During operation the spark plug electrodes are horizontally oriented on the two sides (the top view is shown in the figure). Kistler pressure transducers are located at Pc, Pn1, Pn2, and Pf to monitor the combustor pressure, two nozzle pressures, and the fuel system pressure. Four optical fibers observe the OH emission through ports located on the top of the combustor at OH1-OH4. In these experimental runs the OH4 probe was damaged. The light is carried through the fibers to photomultipliers which have UG11 Schott Glass No. (UV bandpass) filters to block visible wavelengths. The inside diameter of the premixer 28 is 26.6 mm (1.05"). A swirler 30 is located at the premixer 28 entrance shortly before fuel injection. The tip 32 of the guard electrode 18 of the premixer centerbody has been flared to provide local flow acceleration, to encourage the flame to anchor downstream of the premixer exit.

FIG. 2 also identifies the individual spark plug electrodes, labeled A1-A10, and B1-B10, which have a 1" spacing. The OH emission detectors are labeled OH1-OH4, and are on a 2" spacing. The pressure transducers are labeled Pc (combustor), Pn1 (nozzle 1 pressure), Pn2 (nozzle 2 pressure), and Pf (fuel inlet pressure). The guard electrode is on the end of the premixer centerbody.

During operation, the air flow was varied between 470 and 710 SLPM (1000-1500 SCFH), with equivalence ratios from 0.6 to 0.8 using commercial natural gas as the fuel. A variable quarter wave resonator was attached to the fuel manifold to allow for acoustic tuning of the fuel injection system, see Richards, G., Straub, D., and Robey, E., "*Control of Combustion Dynamics Using Fuel System Impedance*," GT2003-38521, Proceedings of TURBOEXPO 2003, Jun. 16-19, Atlanta, Ga., the disclosure of which is incorporated herein by reference. In these experiments, the acoustic tuner was applied to change the magnitude and frequency of the combustion oscillations. A constant bias of +5V has been applied to all electrodes. The current flow from each electrode was read independently through a prototype system built at NETL. Each channel was scaled independently to optimize the signal level. Only twelve current channels were available during the experiments hereinafter reported; electrodes A1-A9, B1, B2, and the electrode were monitored. The analog voltages were recorded on two TEAC recorders at 6 kHz and 12 kHz. One channel on each recorder was reserved for a synchronization signal, which was used to time synchronize all the data upon processing into a digital file.

Figure 3:
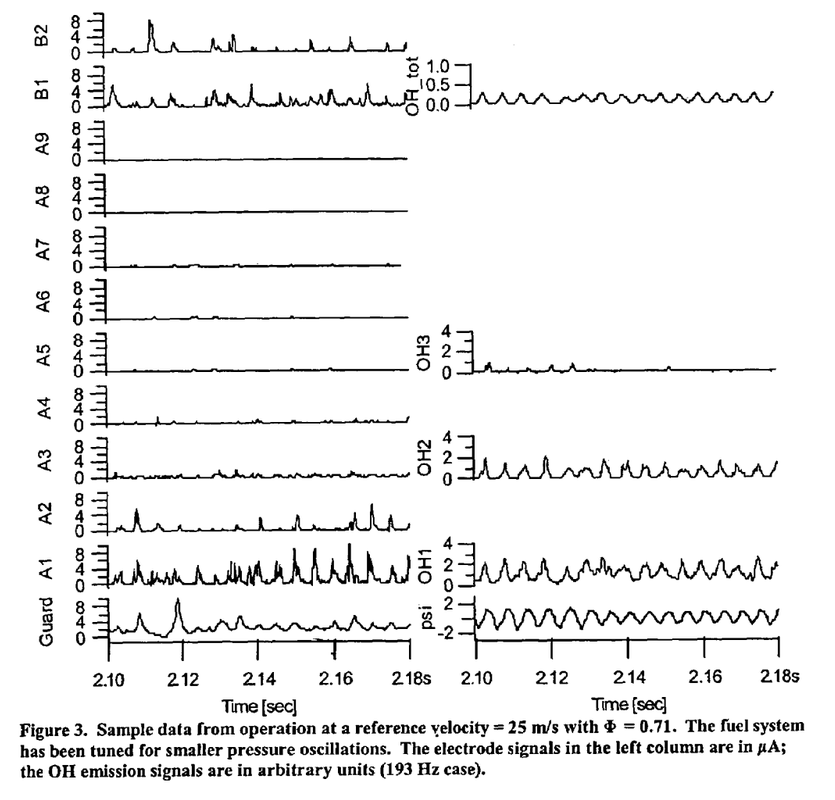
FIG. 3 is a graphical illustration of data from operation of the system illustrated in FIGS. 1 and 2 with a reference velocity of 25 m/s and an equivalence ratio of 0.71.
Figure 4:
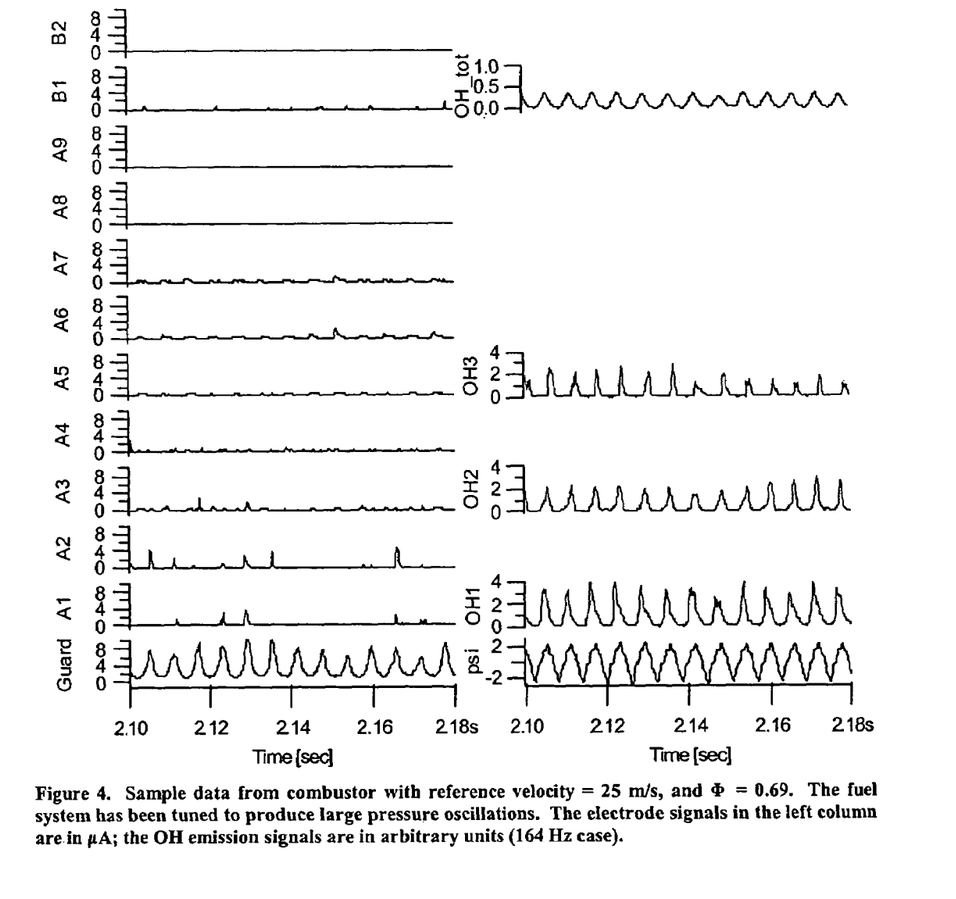
FIG. 4 is a graphical representation of data accumulated as was FIG. 3 but at an equivalence ratio of 0.69, and with a change in the acoustic tuner attached to the fuel system.

Twenty individual signals were monitored at 6 kHz. Two samples of the data are shown in FIG. 3 and FIG. 4. Both show data from the combustor operating with a reference velocity (average airflow velocity in premixer) of 25 m/s and equivalence ratio of 0.7. The acoustic tuner was adjusted to change the magnitude and frequency of the oscillations between the two cases. In the first case (FIG. 3), the primary frequency of oscillation was 193 Hz, with an RMS dynamic pressure of 0.69 psi (4.7%). In the second case (FIG. 4), the primary oscillation shifted to a frequency of 164 Hz with an RMS dynamic pressure of 1.48 psi (10.1%). For simplicity, these will be referred to as the 193 Hz case and the 164 Hz case, respectively hereafter.

In FIG. 3, the fuel system was tuned for smaller pressure oscillations. The electrode signals in the left column are in μA: the OH emission signals are in arbitrary units (193 Hz case). In FIG. 4, the fuel system was tuned to produce large pressure oscillations. The electrode signals in the left column are in μA; the OH emission signals are in arbitrary units (164 Hz case).

The first column of FIG. 3 shows the current carried through each electrode (in μA) for a short segment of time. The direction flow through the combustor follows the plots from the bottom to the top, with the exception of electrodes B1 and B2, which were at the same downstream locations as electrodes A1 and A2 but are on the opposite side of the combustor. The second column of graphs shows the combustor chamber pressure (measured by Pc in FIG. 2 and labeled psi in FIGS. 3 and 4), the signals from the OH point sensors OH1-OH3, and the OH signal from a filtered PMT looking into the combustor from the outlet (OH_tot). The OH point signal graphs have been located adjacent to the corresponding electrode graphs, based on their downstream location.

The results are considered in light of two factors. First, the potential field for each spark plug was very localized. Second, the guard electrode potential field, although further reaching, was also fairly localized. This indicates that the flame position is critical to the measured current from either the centerbody or the wall electrodes.

The electronically excited OH emission in 193 Hz case, shown in the second column of FIG. 3, indicates that the luminous zone of the flame was concentrated in the first 100 mm (4") of the combustor, since the OH emission drops off considerably from the OH2 probe to the OH3 probe. In comparison, the luminous zone of the flame extended past 125 mm (5") in the 164 Hz case, based on the strength of the OH3 signal. Although a small drop in equivalence ratio occurred between the two cases, which would tend to stretch out the flame, the strong increase in pressure oscillation magnitude and the reduction in frequency is more likely to have produced this extension of the luminous flame zone. The larger, slower oscillations move the combustion zone further upstream and downstream in the combustor, creating the strong OH emission signal oscillations. The higher frequency (193 Hz) case did not move the combustion zone as much, which lead to the reduced OH3 signal and the higher baseline signal at OH1.

In contrast, the current signals from the wall electrodes were stronger in the 193 Hz case than in the 164 Hz case. The 164 Hz case did show more evidence of weak current fluctuations downstream, at electrodes A6 and A7, than the 193 Hz case, which agreed with the longer flame suggested by the OH emission signals. But at locations near the premix injector exit, A1-A2, the current signals were distinctly stronger for the 193 Hz case. With the localized nature of the potential fields, this seemed to indicate that the flow pattern within the combustor carried more electrons near the A1 and A2 electrodes in the 193 Hz case than in the 164 Hz case. In the 164 Hz case, the stronger electrode oscillations indicated the movement of the electrons back toward the tip of the injector centerbody, and possibly into the premixer. This flashback behavior was previously observed in previous combustor testing.

Careful examination of the time records for electrodes A1 and B1, and A2 and B2 in FIG. 3 indicates the electron distribution was not spatially uniform across the combustor. This probably indicates the flame was either precessing or flickering at the operating condition. Both time and spatial variation of the flame was apparent on a video record taken from the exhaust end of the combustor. A pattern to the flame movement, however, could be discerned, possibly due to the low (30 Hz) frame rate.

Most importantly, both the 193 Hz and the 164 Hz cases showed a good correlation of the electrode current with the pressure signal. Both showed the same dominant frequency, similar to earlier observations in high pressure testing of flame ionization sensors at NETL, see Straub, D., Thornton, J., Chorpening, B., and Richards, G., "*In-situ Flame Ionization Measurements in Lean Premixed Natural Gas Combustion Systems,*" 2002 Spring Meeting of the Western States Section of the Combustion Institute, Mar. 25-26, 2002, La Jolla, Calif.

Figure 5:
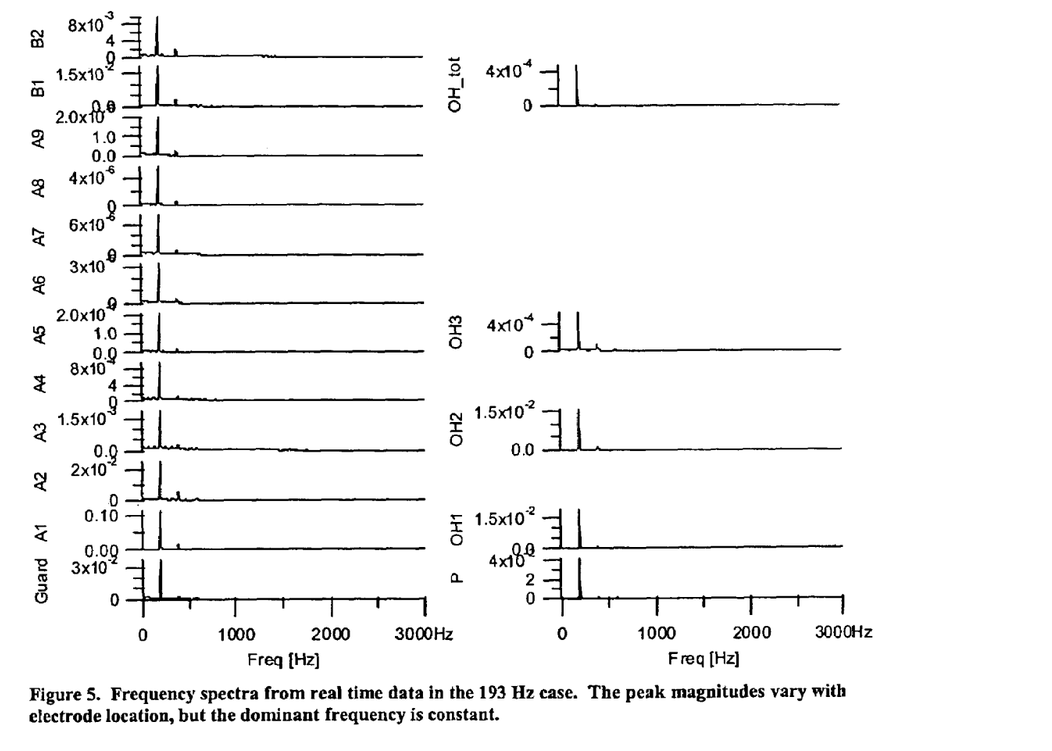
FIG. 5 is a graphical representation of data accumulated during a run under the same conditions as that illustrated in FIG. 3.

This dominant frequency showed up on all the current signals, as well as the OH emission signals as illustrated in FIG. 5.

Figure 6:
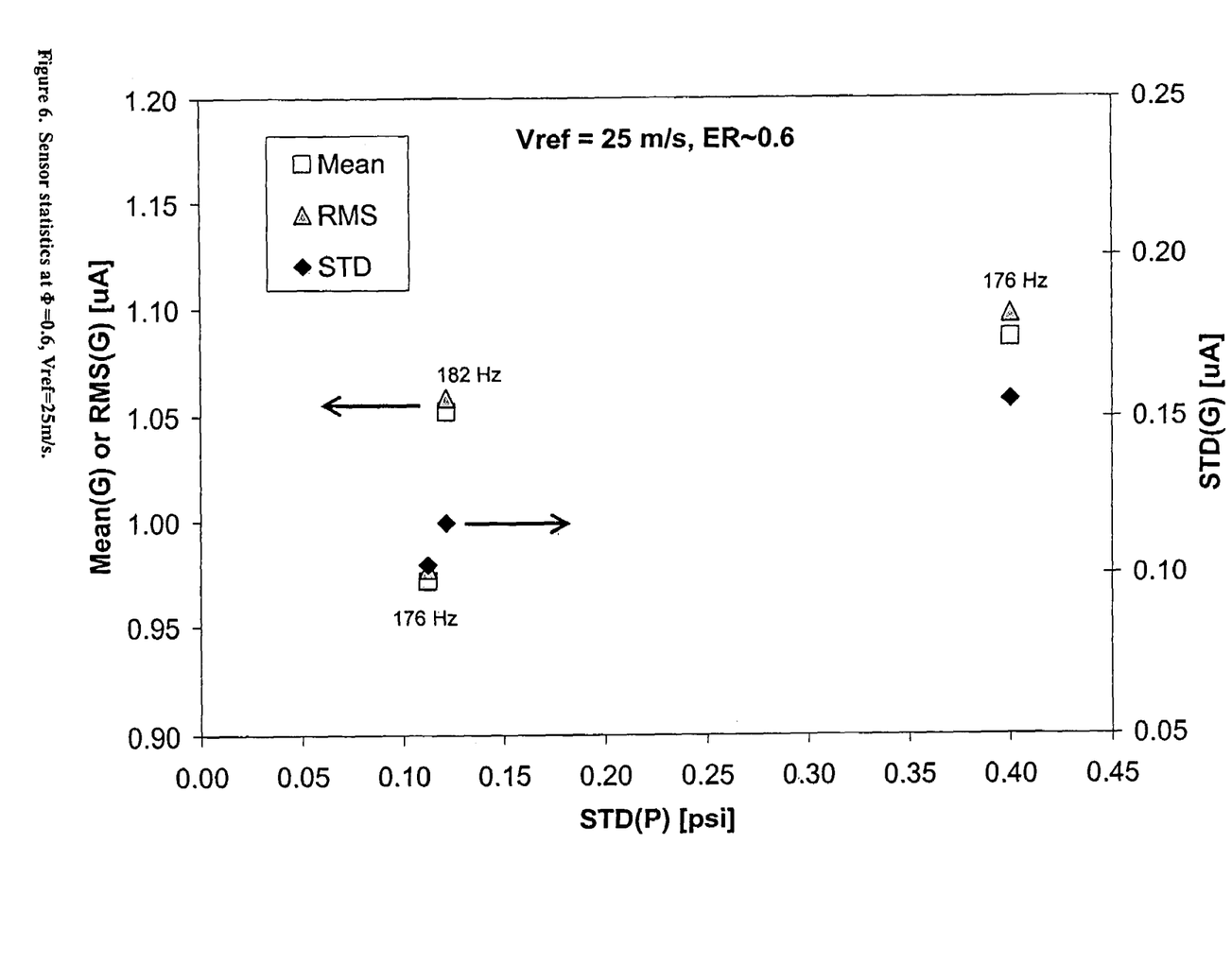
FIG. 6 is a graphical illustration of the relationship between standard deviation of pressure and the mean, standard deviation, and RMS of the electrode in microamps for an equivalence ratio of 0.6 and a Vref of 25 m/s.
Figure 7:
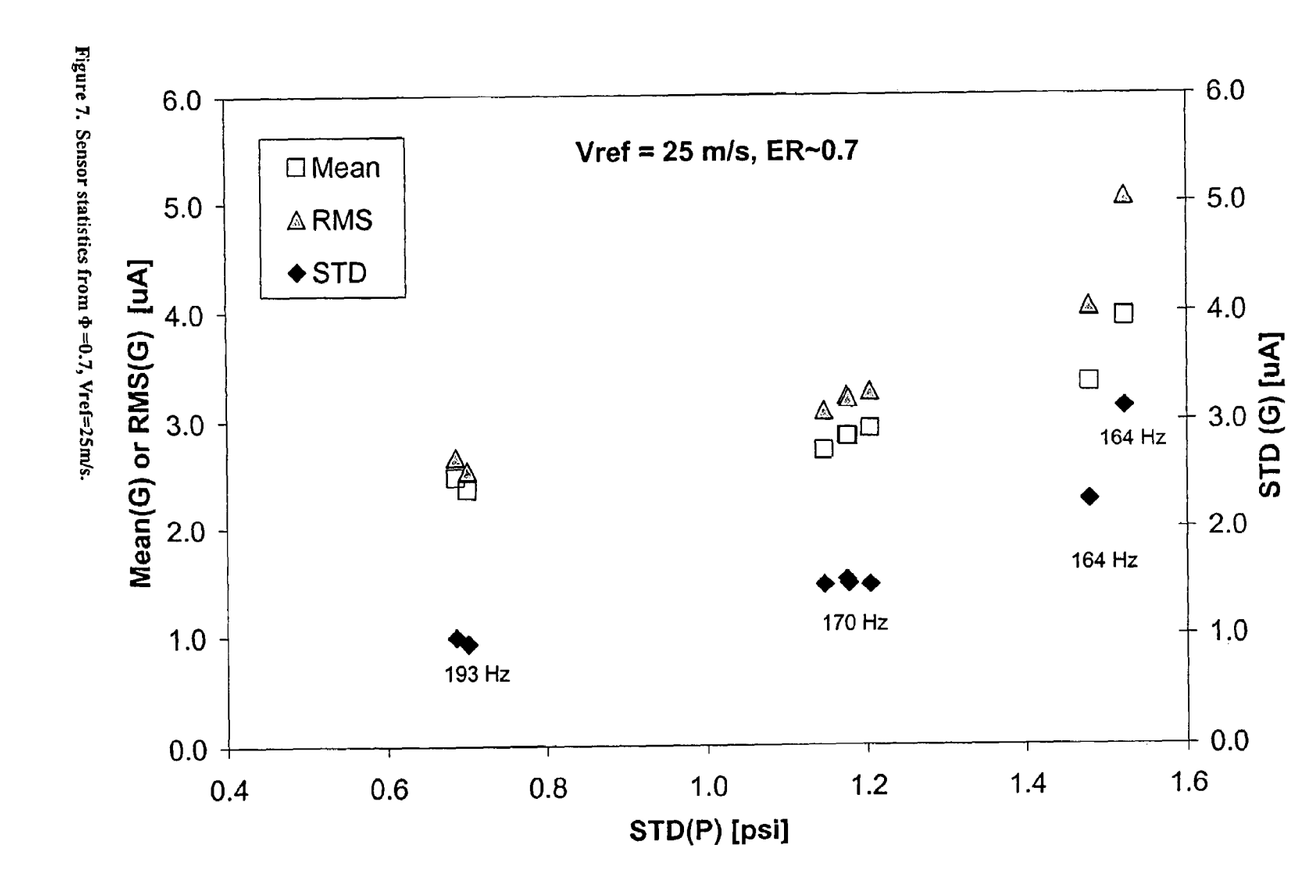
FIG. 7 is a graphical representation like FIG. 6 for a equivalence ratio of 0.7 and Vref of 25 m/s.
Figure 8:
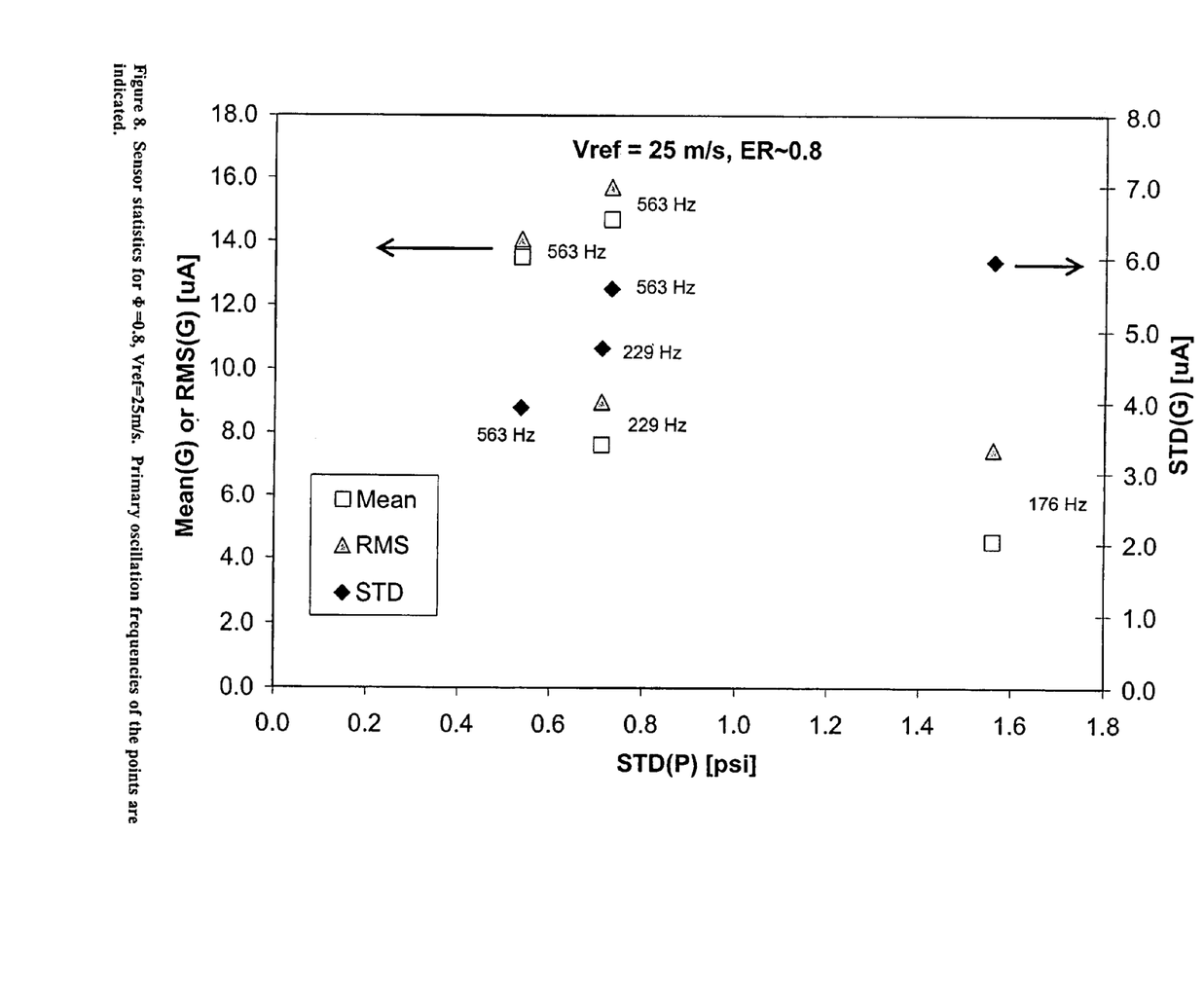
FIG. 8 is a graphical representation like FIGS. 6 and 7 for a equivalence ratio of 0.8 with a Vref of 25 m/s.

A test matrix was run to investigate the link between flame ionization sensor data and dynamic pressure data. This matrix is summarized in Table 1. Three statistics that were examined were the mean value of the electrode (Mean(G)), the root mean square value of the electrode(RMS(G)), and the standard deviation of the electrode (STD(G)). The standard deviation of the chamber pressure (STD(P)) was selected as the baseline statistic since the pressure transducer is a high speed DC transducer. Removal of the mean value in the computation of the standard deviation allows the comparison to focus on the dynamic pressure and not be misled by small offsets in the DC pressure with operating condition. In FIGS. 6-8, the value of statistics is calculated over a four second block of time. All three figures are based on data obtained at the same reference velocity (Vref), 25 m/s. Acoustic tuning of the fuel system allowed variation of the magnitude of the pressure oscillations in the combustor independent of average fuel flow and reference velocity. Acoustic tuning, however, often changed the pressure oscillation frequency as well as its magnitude.

TABLE 1

Summary of Test Matrix Operating Conditions

| | PARAMETER RANGE |
|---|---|
| Reference Velocity | 20-30 m/s |
| Equivalence Ratio Φ | 0.6-0.8 |
| Dynamic Pressure (RMS) | 0.1-1.6 psi |

An overview of the data shows that all three statistics selected for comparison, Mean(G), RMS(G), and STD(G), are functions of the equivalence ratio. This is evidenced in the comparison of the y-axes used for the three figures, with larger y-axis spans necessary for increased equivalence ratio. This trend had been observed previously in Benson, K., Thornton, J. D., Straub, D. L., Huckaby, E. D., Richards, G. A., "*Flame Ionization Sensor Integrated Into Gas Turbine Fuel Nozzle,*" GT2003-38470, Proceedings of TURBOEXPO 2003, Jun. 16-19, Atlanta, Ga., the disclosure of which is incorporated herein by reference, and logically follows from the greater number of ions and electrons generated as the equivalence ratio is increased. Blocking the data by equivalence ratio makes the relationship between the test statistics and the dynamic pressure more easily observed.

Focusing on the data at an equivalence ratio (Φ) of 0.6 (FIG. 6), we observed that the RMS value of the guard current was nearly identical to the mean value in this case. RMS(G) and Mean(G) were both considerably larger signals (~10X) than the STD(G). All three statistics appeared monotonic with the standard deviation of the pressure, STD(P); however, the STD(G) appeared to have much less scatter than RMS(G) and Mean(G) at low pressure oscillations. The scatter in RMS(G) and Mean(G) may be caused by the frequency shift from 176 to 182 Hz.

At an equivalence ratio of 0.6, the mean and RMS values of the electrode current were nearly identical. In comparison, at an equivalence ratio of 0.7 (FIG. 7), there was a separation between RMS(G) and Mean(G), which appeared to increase as the magnitude of the pressure oscillations increase. The difference in signal levels between STD(G) and RMS(G) was considerably reduced, to about a factor of 2. All three statistics were monotonic with STD(P), with low scatter. A nonlinear response appeared to occur with the strongest pressure oscillations. A general decrease in dominant frequency occurred as the magnitude of the pressure oscillations increased, but no sudden jumps from a frequency change were apparent.

All three statistics behaved similarly at an equivalence ratio of 0.7. Significant differences appeared between the three statistics at an equivalence ratio of 0.8, as shown in FIG. 8. At Φ=0.8, only STD(G) remained monotonic with the pressure oscillation, STD(P). The STD(G) was a factor of 2-4X smaller than RMS(G), however this was offset by the large fluctuations in RMS(G) with STD(P). The Mean(G) followed RMS(G), with varying separation between points. The RMS and mean values of the electrode current appeared to respond strongly to the primary frequency of the pressure oscillations, which displayed a large shift from 563 Hz to 229 Hz. The response of STD(G) to the frequency change of the pressure oscillations was much less dramatic.

Based on these results, we concluded that although the STD(G) was smaller signal than RMS(G), the monotonic behavior of STD(G) offered a simpler relationship with STD (P) than RMS(G). This suggested to us that STD(G) is a superior statistic to use for sensor development.

Figure 9:
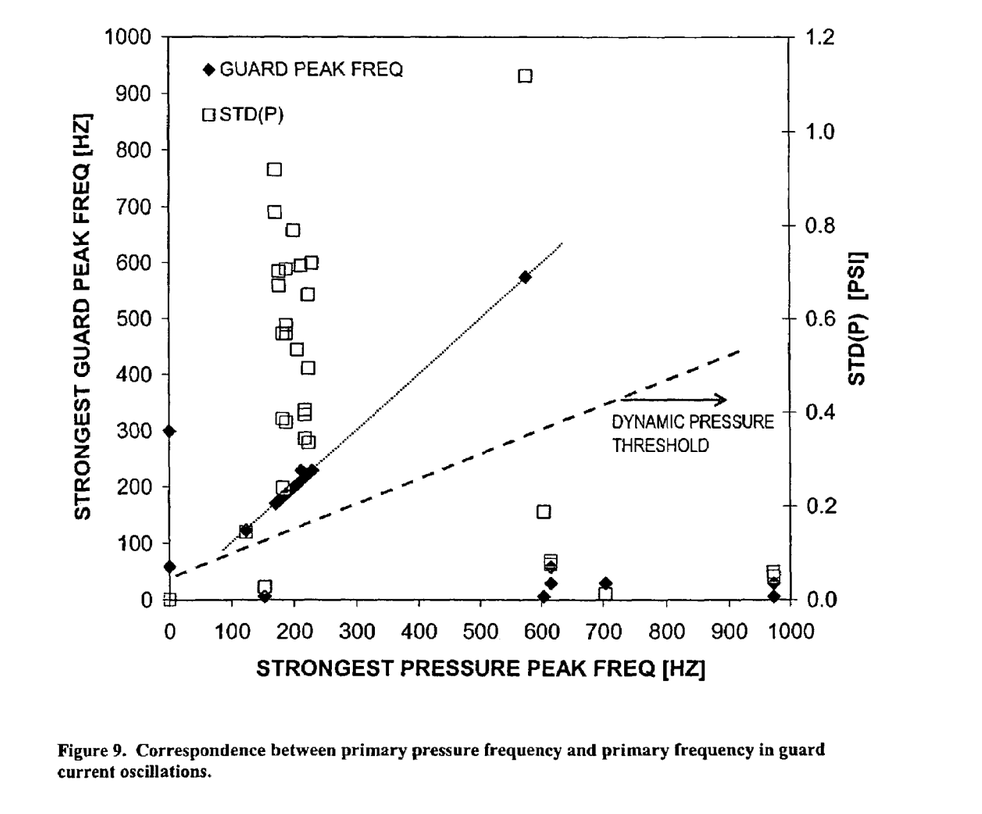
FIG. 9 is a graphical illustration of the correspondence between primary pressure frequency and primary frequency in electrode current oscillations.

In analyzing the data, frequency spectra were calculated for all data. From these spectra, the strongest frequency peaks were determined. The primary frequency peak in the electrode current corresponded to the primary frequency peak in the pressure in most cases, but not all, as shown in FIG. 9. When the primary frequency peaks of the pressure and electrode current match, the points lie along the line with a slope of 1. Examination of the magnitude of the pressure oscillations, given by STD(P), in comparison with the frequency of the pressure oscillations shows that the match between the pressure oscillation and electrode current oscillation frequencies is dependent on the magnitude of the oscillations. If the magnitude of the pressure oscillations lies below the dashed line, then it is too weak to dominate the electrode current signal. If the pressure oscillation is strong enough (STD(P) is above the dashed line), then the pressure fluctuation dominates the electrode current signal, and the strongest frequency in the electrode current matches the strongest frequency in the pressure. This threshold.on the frequency correspondence may be reduced through the application of a higher potential to the electrode.

Figure 10:
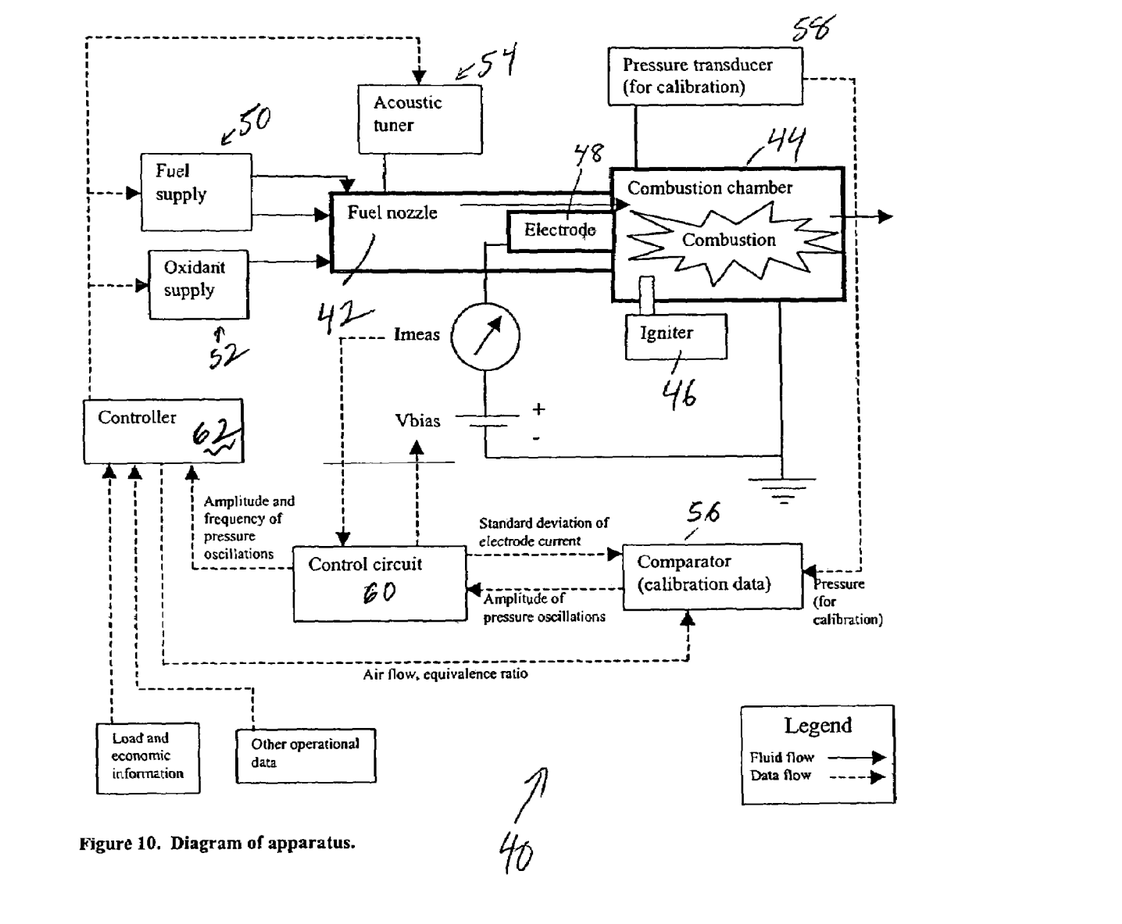
FIG. 10 is a schematic representation of the apparatus for practicing the present invention illustrating the various relationships between fluid flow and data flow.

Referring now to FIG. 10, there is shown a system and apparatus 40 including a premix fuel nozzle 42 in communication with a combustion chamber 44 having connected thereto an igniter 48. An electrode 48 is positioned at the end of the fuel nozzle 42 and more specifically at the juncture preferably located between the combustion chamber 44 and the fuel nozzle 42. The fuel nozzle 42 is also connected to a fuel supply 50 and an oxidant supply 52.

An acoustic tuner 54, as previously disclosed in the aforementioned paper by Richards, G., Straub, D., and Robey, E., GT2003-38521, and U.S. Pat. No. 5,809,769 to Richards et al., is in communication with the fuel nozzle and a pressure transducer 58 and further in communication with the combustion chamber. A comparator 56 receives data from the pressure transducer 58 and transmits data to a control circuit 60 which receives data from the current established in the electrode due to combustion and a voltage across the electrode and ground as indicated in FIG. 10. The control circuit 60 receiving data and transmitting data from the comparator 56 also transits data to a controller 62 which is in data communication with the fuel supply 50 and the oxidant supply 52 as well as the acoustic tuner 54. The controller 62 also may receive data from load and economic information important to the user of the system and other operational data such as gas supply pressure, inlet air temperatures, exhaust temperatures and others, all as is well known in the art.

Computer programs for interconnecting the comparator control circuit controller and other apparatus illustrated in FIG. 10 are also well known in the art.

As seen from FIG. 10, the electrode current is sensed and transmitted to the control circuit 60, which determines its standard deviation and frequencies of oscillation of the electrode current. The control circuit 60 transmits the standard deviation of the electrode current to the comparator 56, and the controller 62 transmits data on the air flow and equivalence ratio to the comparator, which uses the input data to compare with the calibration table to determine the amplitude of the pressure oscillations and if the frequency threshold has been reached. The amplitude of the pressure oscillations and the threshold level status are transmitted from the comparator 56 to the control circuit 60, which then transmits the amplitude of the pressure oscillations and optionally the frequency of the pressure oscillations to the controller 62. Depending on whether the amplitudes and/or frequencies are at a disadvantageous value, the controller 62 through its data connections to the fuel supply 50, the oxidant supply 52, and the acoustic tuner 54 can vary one or more of the fuel supply, the oxidant supply, the equivalence ratio or the acoustic tuner to reduce the amplitudes if required and to control or vary the frequencies, if necessary. Load and economic information as well as any other informational data as is well known in the art can also be inputted into the controller 62 and used in the decision making to control the pressure amplitudes and frequencies in the combustion chamber 44.

During calibration, the frequencies and amplitudes of the pressure are transmitted from the pressure transducer to the comparator 56, along with the transmittal of the standard deviation and frequencies of the electrode current from the control circuit 60 to the comparator 56. These data are transmitted to the comparator over a variety of operating conditions (air flows, equivalence ratios, and acoustic tuner positions) to assemble the calibration table. As discussed previously, other behavioral statistics such as root mean squared (RMS), mean value, average deviation, skew and kurtosis could be used in place of the behavioral statistic, standard deviation, used herein. The examples included herewith cover the application of standard deviation; however, other statistical parameters may be used.

Figure 11:
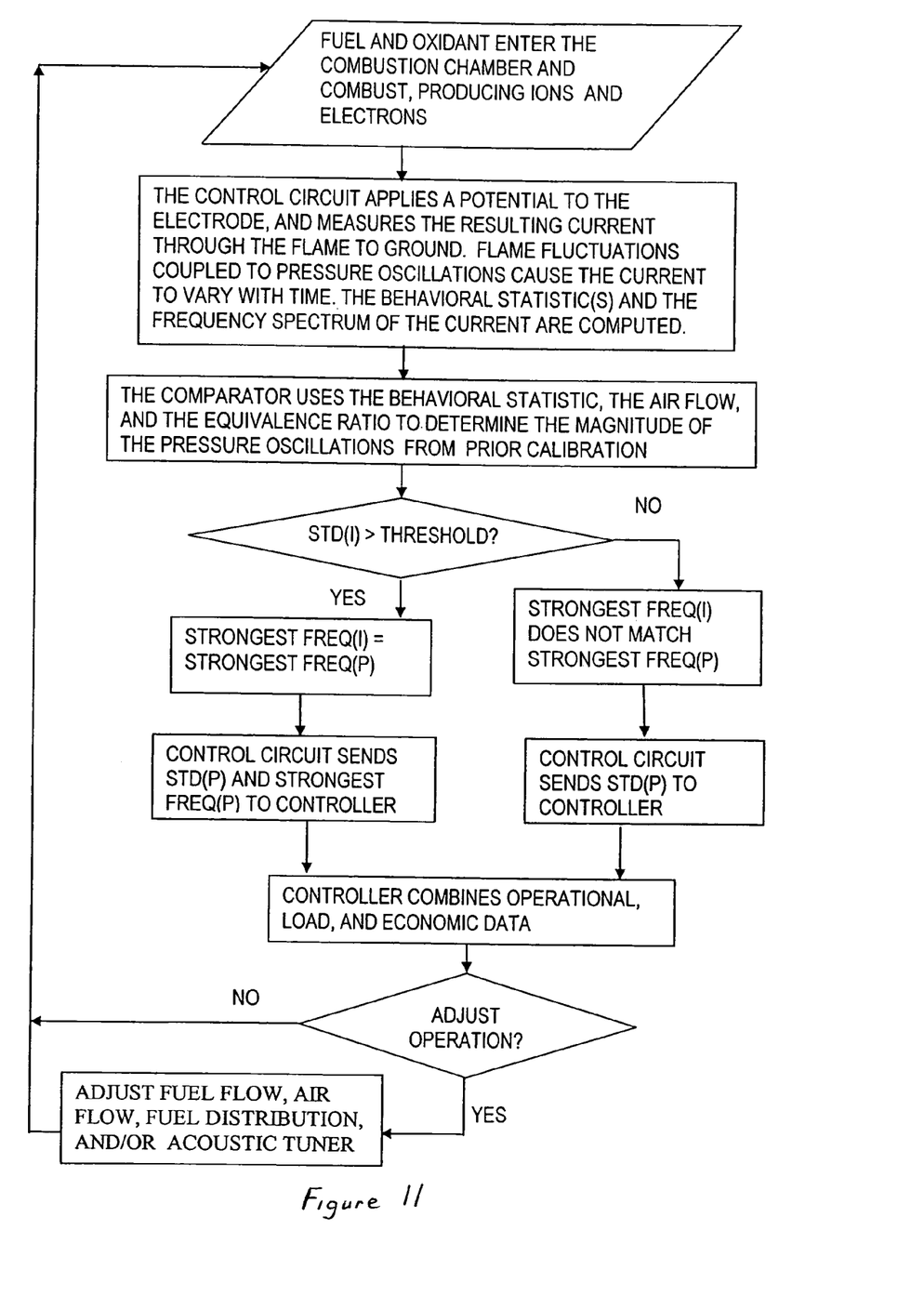
FIG. 11 is flow diagram of the present invention.

Referring now to FIG. 11, there is flow chart which indicates the sequence of operations and decision making in the system 20, as previously described. The flow chart in FIG. 11 is self-explanatory but is incorporated herein as an easy explanation of the means by which the invention is used.

As been demonstrated, the standard deviation of the electrode current has been shown to be monotonically related to the standard deviation of the chamber pressure (the dynamic pressure). Through the use of a quarter-wave resonator, the acoustics of the test combustor were tuned to modify the amplitude and the frequency of the pressure oscillations within the combustor. The mean, RMS, and standard deviation of the guard electrode current are all functions of the equivalence ratio. When blocked by equivalence ratio, the standard deviation of the electrode current emerges as having a monotonic relationship with the dynamic pressure. The mean and RMS of the electrode current do not have a monotonic relationship with the dynamic pressure, in particular at tests at $\Phi=0.8$. This appears to be related to a much stronger sensitivity to the frequency of the combustion oscillations on the magnitude of these statistics. The monotonic relationship between the standard deviation of the electrode current and the dynamic pressure shows that it is possible to monitor combustion dynamics using a flame ionization sensor instead of a pressure transducer, with proper calibration.

While the invention has been particularly shown and described with reference to a preferred embodiment hereof, it will be understood by those skilled in the art that several changes in form and detail may be made without departing from the spirit and scope of the invention.

The embodiments of the invention in which an exclusive property or privilege is claimed are defined as follows:

1. A method of monitoring dynamic pressure oscillations in a combustion process, comprising:

providing a combustion system including a fuel injector equipped with an acoustic tuner in fluid communication with a fuel nozzle, the fuel nozzle in fluid communication with a combustion chamber and a variable fuel supply and a variable oxidant supply along with means for igniting the fuel and oxidant thereby initiating the combustion process producing hydrocarbon ions and electrons and an oscillating flame with dynamic pressure oscillations having both amplitudes and frequencies within the combustion chamber, a means for determining an equivalence ratio in the combustion chamber, and a means for determining a reference velocity, where the reference velocity is the velocity of oxidant entering the combustion chamber through the variable oxidant supply;

providing an electrode in communication with the combustion chamber and hydrocarbon ions and/or electrons produced by the combustion process, where the electrode is connected to a control circuit such that the control circuit emits an electrode signal in response to an electrode current from the electrode in communication with hydrocarbon ions and electrons produced by the combustion process;

calibrating the relationship between electrode signals and dynamic pressure oscillations to produce calibration data by which electrode signal, equivalence ratio, and reference velocity during the combustion process may be correlated to dynamic pressure oscillation in the combustion chamber, by, (a) determining a range of equivalence ratios and a range of reference velocities to be monitored during the combustion process, (b) defining a calibration map, where the calibration map is bound by the range of equivalence ratios along a first coordinate axis and the range of reference velocities along a second coordinate axis, (c) selecting a plurality of calibration points on the calibration map, where a calibration point is described by a specific equivalence ratio and a specific reference velocity, (d) providing a pressure transducer in communication with the combustion chamber and providing a pressure signal, (e) correlating the electrode signals and the pressure signals indicative of dynamic pressure oscillations for each calibration point by
  a. varying the variable oxidant supply and varying the variable fuel supply until the specific equivalence ratio and the specific reference velocity are established,
  b. varying the acoustic tuner until the pressure transducer indicates a predetermined value of dynamic pressure oscillation,
  c. recording the electrode signal, the specific equivalence ratio, and the specific reference velocity while the pressure transducer indicates the predetermined value of dynamic pressure oscillation, and recording the pressure signal from the pressure transducer while the pressure transducer indicates the predetermined value of dynamic pressure oscillation, (f) interpolating between calibration points to produce the calibration data such that an observed electrode signal, an observed equivalence ratio, and an observed reference velocity during subsequent combustor operations may be correlated to an expected pressure signal, where the expected pressure signal is a value of the pressure signal predicted for the observed electrode signal, the observed equivalence ratio, and the observed reference velocity based on the calibration data; and monitoring the dynamic pressure oscillations in the combustion chamber during subsequent combustor operations by determining the observed electrode signal, the observed equivalence ratio, and the observed reference velocity, correlating the observed electrode signal, the observed equivalence ratio, and the observed reference velocity to the expected pressure signal using the calibration data, and using the expected pressure signal to indicate the dynamic pressure oscillation in the combustion chamber.

2. The method of claim 1, wherein the electrode signal is at least a first statistical parameter derived from a distribution of electrode current over a time interval during calibrating, and wherein the pressure signal is at least a second statistical parameter derived from a distribution of pressure transducer signals over the time interval during calibrating, wherein the first statistical parameter is monotonically related to the second statistical parameter.

3. The method of claim 1, wherein the fuel nozzle is a lean premix fuel combustion nozzle.

4. The method of claim 1, wherein the electrode is proximate the flame during combustion.

5. The method of claim 1, wherein the electrode signal consists of a first statistical parameter of the electrode current over a time interval and a Fourier transform of the frequency of the electrode current over the time interval, and wherein the pressure signal consists of a second statistical parameter of the pressure transducer indication over the time interval and a Fourier transform of the frequency of the pressure transducer indication over the time interval.

6. The method of claim 5, wherein the first statistical parameter and the second statistical parameter are a standard deviation.

7. The method of claim 2, wherein the first statistical parameter and the second statistical parameter are a standard deviation.

8. The method of claim 5, wherein the first statistical parameter and the second statistical parameter are a standard deviation.

9. The method of claim 1, wherein if the expected pressure signal indicates a predetermined value of dynamic pressure oscillation, one or more of the fuel flow rate, the oxidant flow rate, the equivalence ratio, and the fuel distribution in the combustion chamber is controlled so that the expected pressure signal is reduced below the predetermined value of dynamic pressure oscillation.

* * * * *